No. 710,717. Patented Oct. 7, 1902.
S. SEBBA & A. COHEN.
PHOTOGRAPHIC SHUTTER.
(Application filed Jan. 7, 1902.)

(No Model.) 2 Sheets—Sheet 1.

Witnesses
R. W. Pittman
Fred E. Maynard

Inventors;
Soloman Sebba
Alchanan Cohen
By their Attorney
Francis H. Richards

THE NORRIS PETERS CO., PHOTO-LITHO., WASHINGTON, D. C.

No. 710,717. Patented Oct. 7, 1902.
S. SEBBA & A. COHEN.
PHOTOGRAPHIC SHUTTER.
(Application filed Jan. 7, 1902.)
(No Model.) 2 Sheets—Sheet 2.
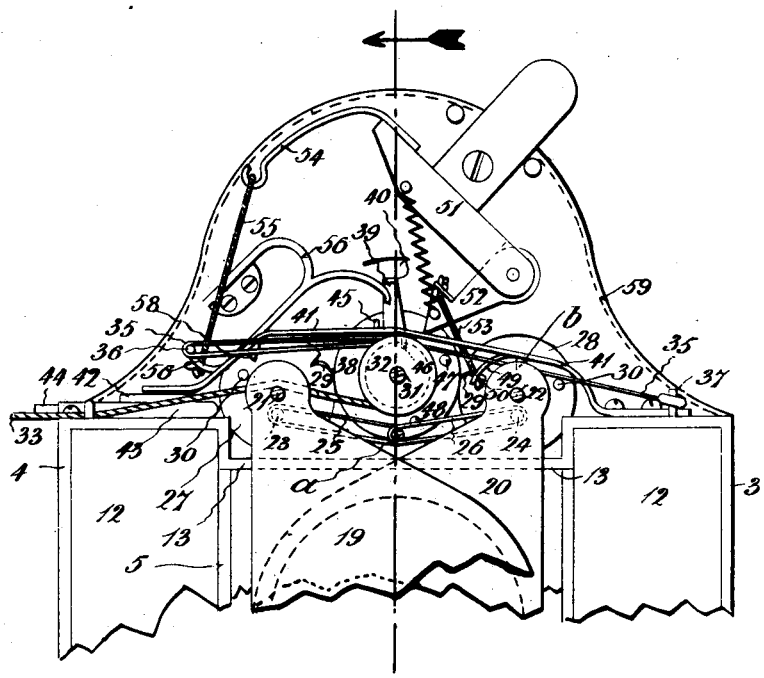
Fig. 5.
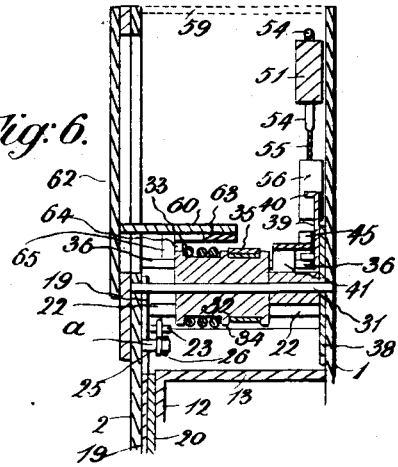
Fig. 6.
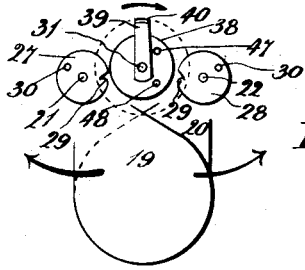
Fig. 7.
Fig. 8.
Witnesses
R. W. Pittman
Fred E. Maynard
Inventors:
Soloman Sebba
Alchanan Cohen
By their Attorney
Francis H. Richards

UNITED STATES PATENT OFFICE.

SOLOMON SEBBA AND ALCHANAN COHEN, OF CAPETOWN, CAPE COLONY.

PHOTOGRAPHIC SHUTTER.

SPECIFICATION forming part of Letters Patent No. 710,717, dated October 7, 1902.

Application filed January 7, 1902. Serial No. 88,816. (No model.)

*To all whom it may concern:*

Be it known that we, SOLOMON SEBBA and ALCHANAN COHEN, subjects of the King of Great Britain and Ireland, residing at 37 Sir Lowry road, Capetown, Cape Colony, have invented certain new and useful Improvements in Photographic Shutters, of which the following is a specification.

This invention relates to pivoted shutters for photographic cameras, as well as to operating mechanism therefor; and it consists, substantially, in the improvements hereinafter more particularly described.

The invention has for its object to provide an effective form of shutter for photographic cameras and also to provide means whereby the elements or members thereof may be positively operated for obtaining either instantaneous or "time" exposures of the photographic plates.

A further object is to simplify the construction and organization of the operative mechanism for the shutter and also to provide a mechanism of this character which is reliable in action and which also is easily controlled by the operator at all times.

A further object of the invention is to provide means, such as a sound-emitting effigy or device, for attracting and holding the attention of persons or subjects while in position before the camera to be photographed, so that there is less liability to movement of the person or subject during the time of exposure of the photographic plate.

The invention also has additional objects in view, substantially as will more fully hereinafter appear when taken in connection with the accompanying drawings, wherein—

Figure 1:
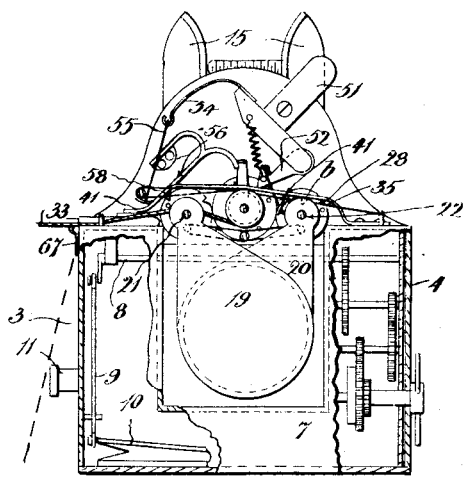
Figure 2:
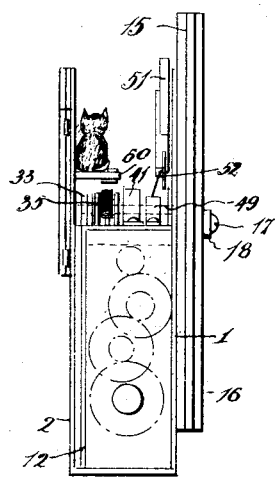
Figure 4:
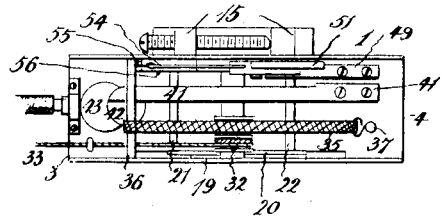
Figure 3:
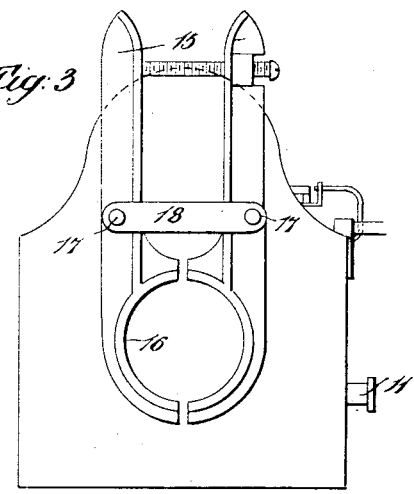

Figure 1 is a front elevation of our improved shutter for photographic cameras, the upper part of the front of the casing being removed and the lower part of said casing being partly broken away at the front and partly in section to more clearly disclose the interior mechanism, the operative devices or mechanism for the elements or members of the shutter itself being shown as mounted or organized at the upper part of said casing. Fig. 2 is a side view of Fig. 1 looking toward the right of the latter. Fig. 3 is a rear view to more clearly indicate the construction and organization of the elements or parts constituting the clamping device for the casing or hood of a lens (not shown) to which said device may be applied. Fig. 4 is a top plan view of Fig. 1. Fig. 5 is an enlarged front elevation in detail of the construction and organization of elements shown in Fig. 1, the same being broken away at the lower part thereof and the front of the box or case being removed to disclose the operative mechanism for the shutter elements or plates. Fig. 6 is an enlarged vertical transverse sectional elevation taken on the vertical central broken line in Fig. 5 and looking in the direction of the arrow above the said latter figure. Fig. 7 is a diagrammatic view, on a reduced scale, illustrating more clearly the mode of operation of the several disks through the medium of which the elements or members constituting the pivoted shutter are operated. Fig. 8 is also a diagrammatic view in plan, indicating the mode of operation of the devices or means by which the sound-emitting device or effigy is brought into view at the proper time.

Before proceeding with a more detailed description it may be stated that our improved shutter for photographic cameras comprises, substantially, two concentric disks or plates normally disposed one behind the other as a closure for the lens-opening in the casing of the camera, said elements or members being pivoted to swing outwardly one after the other upon proper manipulation of the means by which the operative devices therefor are actuated. The said shutter elements or members and the means for operating the same are so constructed and organized that both instantaneous and time exposures may be derived therefrom by but slight changes in the setting of certain parts of the mechanism, all as will more fully hereinafter appear. The sound-emitting device is mounted in any suitable position upon the casing of our improved shutter-operating mechanism, and said device may consist of the effigy or image of a cat, dog, or other animal, which may be brought to view by the operator or photographer, either before exposing the photographic plate or simultaneously with such exposure, any suitable means being employed for producing the emission of sound from the effigy or image, the means employed in the present case being preferably contained within the casing and comprising a bellows and clockwork mechanism for operating the same.

Specific reference being had to the accompanying drawings by the designating characters marked thereon, 1 represents the back of a suitable box or case, and 2 the front part thereof, the ends of said box or case being indicated at 3 and 4, respectively. The box or case is divided internally by partitions 5 and 6, so as to constitute side chambers, in one of which is located a gear-train or clockwork mechanism 7 of ordinary embodiment, the said mechanism being in connection with a horizontally-mounted shaft 8, Fig. 1, by which to rotate said shaft, and the shaft is formed with a crank at one end, movably connected with a rod 9, which in turn is operatively connected with a bellows 10, located in the other or opposite side chamber of the box or case. Upon rotation of the shaft 8 in the manner shown and described the bellows 10 is caused to emit a sound or sounds which in some instances may be made to closely resemble the cry peculiar to the particular effigy or image employed for attracting and holding the person or subject while being photographed, and in the present instance the effigy is in the form of a cat suitably mounted in position to be brought to view when required. The sides of the box or case may be pivoted or hinged, so as to swing outwardly at the bottom, as shown at the left hand of Fig. 1 in dotted lines, and the side portion adjacent to the connecting-rod 9 is provided with a stop near the point of connection of said rod with the bellows, also as shown in Fig. 1, which stop is for the purpose of engaging said rod and preventing movement thereof until the same is released by swinging out the side portion in any suitable way, such as by means of a handle 11, which may be taken hold of and pulled upon by the operator or attendant in charge. As shown in Fig. 6, a division-plate 12 is located within the box or case to the rear of or behind the front plate 2, leaving a space between in which to accommodate the elements or members of the shutter proper, said elements being suspended to swing outwardly and vertically within the said space. The said division-plate 12, as well as the front and back plates, may each be provided with an opening (not shown) for passage of light to the lens, and located centrally of the said chambers of the box or case is a light-tight chamber, in the front of which is the opening (dotted lines, Figs. 1 and 5) before which the shutter elements or members are normally located or positioned, it being understood that said opening is for the accommodation or reception of the end of the casing or hood of the lens. (Not shown.) We provide a suitable clamping device for the casing or hood of the lens, said device being mounted in position at the outer surface of the back 1 of the box or case and comprising two vertical parallel arms 15, each being correspondingly curved at its lower end 16 to conform to the shape of the said lens casing or hood, (not shown,) the latter being received and held between the said curved portions in a manner quite apparent. The said vertical parallel arms 15 are connected at suitable points thereof by means of a plate 18, suitable fastening pins or screws 17 being employed, passing through the ends of said plate and through the arms and into the said back portion of the box or case, and an adjusting-screw passes through one of the arms, at the upper end thereof, with its end bearing against the other arm, and by properly turning said screw the lower curved portions 16 of the clamping device may be adjusted in any suitable manner with reference to the lens casing or hood.

The shutter proper comprises two substantially concentric plates 19 and 20, the latter arranged immediately behind the former and each being provided with a lateral extension, which is hung to or suspended from a transverse spindle, the ends of which are journaled, respectively, in the front and back portions of the box or case, said transverse spindles in the present instance being indicated by the numerals 21 and 22. Said plates are respectively provided on the inner surface of the lateral extensions thereof with projections 23 and 24 in line with and below the spindles 21 and 22, and springs 25 and 26 are fitted at their outer ends upon said projections, the inner ends of the said springs being slipped over or fitted upon a pin $a$, projecting from the inner face of the rear portion 2 of the box or case. These said springs 25 and 26 serve to insure the return movement of the shutter plates or disks after they have been swung outwardly or actuated to enable an exposure of the lens-opening to be made. The spindles 21 and 22, respectively, are provided at the rear ends thereof with disks 27 and 28, each provided with a projection 29 at a suitable point of the circumference thereof and each also being provided with a stud 30, said projections and studs operating in the manner about to be described, so as to set or hold the shutter elements or plates during exposures of the photographic plates through the lens-opening in the box or case. Mounted slightly above the said spindles 21 and 22 is a third transverse spindle 31, upon which is carried a drum 32, around which is wound an operating-cord 33, preferably of gut or like material, and the inner end of which is secured to the said drum. The outer end of the said operating-cord is carried to the outer side of the box or case and is the medium of manipulation through which the operating devices for the shutter elements or plates are actuated. The said cord 33 occupies one of the circumferential divisions of the drum 32 formed by a central circumferential flange or collar 34, formed with said drum, and in the other circumferential division of the drum is contained a spring or similar elastic medium 35, which is coiled about the drum, the inner end of said spring or elastic medium being secured to the drum. Said medium or spring 35 after leaving the drum around which it is wound or coiled is first carried to one side and passed around a transverse bar 36, extending between the back and front of the box or case. Thence it is carried back or across the apparatus in reverse direction and the end or extremity thereof fastened or secured to a pin 37. (See Fig. 5.) Upon taking hold of the manipulating-cord 33 and pulling upon the same the drum 32 is turned or revolved in a right-hand direction, and said spring or elastic medium 35 is thereby tightened upon the drum and put under tension tending to carry the drum back to the position from whence it started. After being turned to a certain position by drawing upon the cord 33 the drum is held or retained in such position until released in the manner to be described, whereupon it is caused to revolve in the reverse direction at a comparatively rapid speed, and on such reverse rotation thereof the outermost one of the shutter elements or plates is operated or swung outwardly at one side, thus giving a short exposure to the lens-opening, the innermost shutter element or plate having been previously operated in like manner on the first movement or rotation of the drum. To enable these operations to be effected, the centrally-located spindle 31 is provided at the rear end with a disk 38, to which is secured a normally vertical arm 39, preferably of thin sheet metal and formed and provided with a turned-over end or detent 40, the said arm being capable of springing outwardly with reference to the outer face of said disk 38. To one side of the said arm 39 (to the right in the drawings) the said disk 38 is formed with pins 47 and 48, and secured to the top of one of the side chambers of the box or case, by means of screws or otherwise, is one end of a spring 41, which is slightly curved upwardly and extends all the way across the box or case, said spring being thus bent downwardly and provided at its free end with a disk 42, seated or resting upon the upper surface of an inflatable device or bulb 43, located on top of the opposite side chamber of the said box or case, said inflatable device or bulb 43 having a tubular connection 44, (broken off in the drawings,) to the end of which a suitable hand-bulb (not shown) is attached, and which when squeezed or compressed causes the said inflatable device or bulb 43 to expand or become inflated, which action raises the free end of the spring 41 in the manner and for the purpose hereinafter more fully described. The spring 41 is provided on opposite sides of the approximately central portion thereof with upwardly and downwardly extending projections 45 and 46, set to one side of or out of alinement with each other, so as to be within the paths of movement of the said pins 47 and 48 of disk 38, by which one or the other of said projections will be engaged by one or the other of the said pins, accordingly as the shutter elements or plates are operated or swung outwardly for instantaneous or time exposure of the lens-opening. Another spring 49 is also secured at one end by suitable screws or otherwise to the top of the right-hand chamber or compartment of the box or case, and this spring is so constructed and organized that its outer end 50 may be raised or lowered, and when lowered to lie in the path of movement described by the stud 30 of the right-hand disk 28 when said disk 38 is operated to be turned by engagement of the arm 39 with the beveled projection 29 thereof. The free end of said spring 49 is operated to be raised or lowered by means of a connection 53, fastened thereto at one end, the upper end of said connection being also fastened to a spring-governed arm 52, with which coöperates a rocking lever 51, and by turning said lever 51 in one direction or the other the end of the said spring-controlled arm is caused to be raised or lowered correspondingly, and thus the said spring 49 will also be affected, as is clearly obvious. The said rocking lever 51 is attached to an arm pivoted within the apparatus at the upper part and projecting above the same to be conveniently taken hold of for the purpose of operating the said rocking lever 51, the movement of said operating-arm being limited by suitable stops arranged on either side thereof, as clearly shown in Fig. 5. The said lever 51 is provided at its upper end with a curved extension or hook 54, which in turn is connected with the lower end of a spring 56, secured to the inner face of the back part 1 of the box or case of the apparatus by means of screws, as shown in Figs. 1 and 5. The said spring 56 is formed at its upper part with a curved branch or member extending over to be engaged by the detent 40 on arm 39 of the disk 38 and serves as a stop for limiting the return movement of the said arm after it has been carried around to effect the operation of the shutter elements or plates. The parts being thus organized, by pulling upon the cord 33 the drum 32 is rotated and winds up a portion of the spring 35 thereon, and during this movement of the drum the disk 38 of course turns therewith and the arm 39 of said disk is carried around into contact with the beveled projections 29 of the right-hand disk 28, thus pushing said projection downwardly and rotating said disk 28, and thereby turning the spindle 22 and raising or swinging the inside shutter member or plate 20 outwardly, and said plate is held in its raised position as the result of the engagement of stud 30 upon disk 28 by a tooth $b$, projecting from the under side of the said spring 49, such engagement preventing the falling of the said shutter member or plate until released in the manner about to be described. The continued movement of the disk 38 in the same direction brings the said arm 39 into contact with the projection 29 upon opposite disk 27; but as the edge of the said projection is beveled or inclined upwardly, as shown in Fig. 5, the said arm obtains no purchase thereagainst, but slides over the projection in a yieldable manner, the arm, as before mentioned, having the capacity to bend outwardly from its normal position. Thus, it will be seen, that in this movement of the arm 39 the shutter member or plate 19 is not affected, but is left in its normal position for maintaining the lens-aperture closed. In the turning of the disk 38 with the arm 39 the stud 47 on said disk engages the under side of spring 41 and passes beneath the latter, whereupon said spring again descends, and the lowermost projection 46 thereon engages the said stud 47 in such manner as to hold the disk 38 from return movement and also against the action or tendency of the actuating-spring 35 on the drum 32, the latter element of course constituting the intermediary through which the movements of the said disk 38 and arm 39 are effected. Now by squeezing or compressing the hand-bulb (not shown) the bulb 43 becomes filled or inflated with air and is in consequence distended, and this distention thereof operates upon the disk 42, seated thereon, in such manner as to elevate or raise the free end of spring 41 to a sufficient extent to release engagement of the projection 46 and stud 47, whereupon the recoil or reactionary effect of the spring 35 causes the said drum to turn in the reverse direction, which reverse movement of the drum is of course accompanied by a similar movement of the disk 38 and arm 39. In this movement of the arm 39 the latter is brought into contact with the edge of the projection 29 of disk 27 and carries the same downwardly, the said disk 27 being thereby turned or rotated so as to swing the outermost member 19 of the shutter upwardly and outwardly to momentarily expose the lens-opening, it being in this way that the so called "instantaneous" exposure of such opening is effected by the means herein illustrated and described. As soon as the arm 49 passes or releases its engagement with the said projection 29 of the disk 27 the said outermost member or plate of the shutter immediately descends to its former or normal position, and on the continued return movement of said arm 39 the detent 40 thereof is brought into contact with the spring 49 (which is now holding the member or plate 20 of the shutter in its raised position) and lifts said spring sufficiently to release engagement of tooth b thereof with the stud 30 on disk 28. As soon as such release is effected the said innermost member or plate 20 of the shutter also falls or descends to its former or normal position behind the member 19. To effect or obtain a time exposure of the lens-opening, the lever 51 is turned or rocked in the left-hand direction, whereupon the lower end of spring 56 (which up to this time has been drawn upwardly by said lever 51 and intermediate connections) assumes a lower position and at the same time in virtue of the arm 52 of the lever being carried in the left-hand direction the end of the said spring 49 is also lowered. At this time the cord 33 is pulled upon in the same manner as before and identically the same operation of all the parts hereinbefore described again takes place, and by distending the inflatable device 43 the spring 41 is raised, as before, releasing the disk 38, which rotates reversely, its arm 39 striking the projection 29 on the left-hand disk 27; but inasmuch as the lower end of spring 56 now occupies a lower position than it did before a tooth 58 thereon is caused to engage the stud 30 of said disk 27, thus checking the return movement of the latter, and consequently of the member 19 of the shutter. Also at this time the stud 48 of disk 38 is engaged by the upper projection 45 of the spring 41, and thus the return movement of the said disk and arm is arrested and the exposure of the lens-opening may be continued until such time as the bulb 43 is deflated of its contained air. As soon as said bulb 43 is deflated the free end of the spring 41 is caused to descend and the engagement between stud 48 and projection 45 is broken, and thus the disk 38 and its arm 39 are permitted to describe their return movement through the reactionary force of the spring 35 on the drum 32. At the completion of its return movement the arm is engaged by the inwardly-curved branch of spring 56 and is thus prevented from being carried over too far, said arm acting to move said spring sufficiently to release disk 27.

The effigy or image for attracting the attention of subjects or persons being photographed is located between upper extensions (such as 59, Fig. 5) of the frame of the box or case of the apparatus, such effigy or image in the present case being shown as that of a cat seated upon a platform 60, to which is pivotally connected a rod 61, (see Fig. 8,) in turn movably connected to a door 62. The platform 60 is supported by a horizontal arm 63, pivotally supported at 64 and cranked at its end 65, the end of the crank engaging with the fork or bifurcated ends 66 of a plate 67, attached to the inner side of one of the said extensions 59 of the frame of the box or case. By this means when the outwardly-swinging side of the case or box is turned outwardly to release the connecting-rod 9 between the shaft 8 and bellows 10 the platform 60 is advanced and the door 62 opened simultaneously with the starting of the clockwork mechanism to operate said bellows.

It will be understood that we are not restricted in practice to the precise details of construction and organization of the several elements contributing to our present invention, since immaterial changes therein could be resorted to and still be within the scope and spirit of the invention.

Having now particularly described and ascertained the nature of our said invention and in what manner the same is to be performed, we declare that what we claim is—

1. In a shutter for photographic cameras, the combination of an outer casing having a lens-aperture and constructed with side chambers, a bellows in one of said chambers, and a gear-train in the other, intermediate connections from the gear-train for operating the bellows, a device for engaging said connections to check the motion thereof, an effigy and means for bringing the same into view on disengaging the checking device, a pair of vertically-swinging shutter-plates pivoted one behind the other and normally closing the lens-opening, springs for retaining said plates in position, movable disks mounted upon the pivots for the said shutter-plates and each provided with a projection and a stud, a centrally-mounted movable disk and a spring-arm turning therewith, said arm moving in the path of said projection and being engaged thereby, a spring-actuated drum, and a cord for operating said central disk and spring-arm, springs with teeth for checking the movement of the shutter-plates to give time exposures, and a rocking lever for releasing the plates to give instantaneous exposures.

2. In a shutter for photographic cameras, the combination with a suitable casing having a lens-opening, and means for attracting the attention of a subject sitting before the camera, of two shutter-plates 19 and 20 and supporting-spindles therefor, springs 25 and 26 normally retaining said plates in closed position one behind the other to exclude light from the lens-opening, movable disks 27 and 28 mounted upon said spindles, and each formed with a stud 30, and a projection 29, having inclined edge, the drum 32 having the spring wound thereon, the cord 33 for operating said drum and placing its spring under tension, a centrally-mounted movable disk 38, having studs 47, 48 and a spring-arm 39, moving therewith, the latter having a detent 40 at the end thereof and moving in the path of said projections 29, springs 49 and 50, having teeth for engaging the said studs 30, whereby the movement of the shutter-plates is temporarily checked, the spring 41, having stops engaging the studs on the central disk, a pneumatic bulb for actuating said spring, the rocking lever 51, springs 49 and 56, and the intermediate connections between said springs and rocking lever for effecting time and instantaneous exposures.

3. In a shutter for photographic cameras the combination of the shutter-plates 19, 20 located one behind the other, with their actuating-disks 27, 28 and the spring-actuated disk 38 spring-arm 39 and detent 40 for effecting the movement of the said shutter-plates, substantially as described.

4. In a shutter for photographic cameras, the combination of the spring-actuated shutter-plates 19, 20 and spring-actuated disk and spring-arm 39 and detent 40 with the springs 41, 49, 56 and their stops or teeth 58 and $b$ for holding the shutter-plates for the time exposure and the means for adjusting the position of the said springs, substantially as herein described.

5. A shutter for a photographic apparatus, comprising an outer casing having side chambers, a sound-producing device in one of said chambers, an operating mechanism therefor in the other chamber and intermediate connections between the two, means for checking the action of said mechanism by engagement with said connections, and an effigy operated to be brought into view before the casing on release of the means engaging said intermediate connections.

6. A shutter for a photographic apparatus, comprising two substantially concentric plates pivoted to swing outwardly from each other to expose the lens-opening, a central spring-actuated drum, disk, and arm, disks at opposite sides of said central disk each formed with a beveled projection, and each also having a stud on its face, said central disk being provided with similar studs in duplicate, a spring having projections adapted to engage the studs of said central disk, an inflatable device coöperating with the free end of said spring, and means for engaging said outer disks in position to maintain the plates of the shutter in position to effect the desired exposure of the lens-opening.

In witness whereof we have hereunto set our hands in presence of two witnesses.

SOLOMON SEBBA.
ALCHANAN COHEN.

Witnesses:
JOHN RICHARD BLACK,
JAMES BRUCE CLEGHORN.